United States Patent
Ichimura et al.

(10) Patent No.: US 7,492,903 B2
(45) Date of Patent: Feb. 17, 2009

(54) SECRET KEY DISTRIBUTION METHOD AND SECRET KEY DISTRIBUTION SYSTEM

(75) Inventors: Kouichi Ichimura, Yokohama (JP); Noritsugu Shiokawa, Yokohama (JP); Mikio Fujii, Kawasaki (JP); Kentaro Torii, Tokyo (JP); Kenji Ohkuma, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 772 days.

(21) Appl. No.: 10/975,444

(22) Filed: Oct. 29, 2004

(65) Prior Publication Data
US 2005/0111665 A1 May 26, 2005

(30) Foreign Application Priority Data
Oct. 30, 2003 (JP) ............................. 2003-370922

(51) Int. Cl.
H04K 1/08 (2006.01)
(52) U.S. Cl. ..................................................... 380/278
(58) Field of Classification Search .................. 380/28, 380/256, 278
See application file for complete search history.

(56) References Cited

U.S. PATENT DOCUMENTS

| | | | |
|---|---|---|---|
| 6,522,749 B2* | 2/2003 | Wang | 380/263 |
| 6,748,083 B2* | 6/2004 | Hughes et al. | 380/278 |

2004/0131179 A1  7/2004  Ichimura et al.

FOREIGN PATENT DOCUMENTS

| | | |
|---|---|---|
| JP | 11-346211 | 12/1999 |
| JP | 2001-339387 | 12/2001 |
| JP | 2004-187274 | 7/2004 |

OTHER PUBLICATIONS

Entangled-photon quantum cryptography by —Kwait P.G.; White, A.G.; Peterson, C.G.; Naik, D.S.; Bengludn A.J. Published at Quantum Electronics and Laser Science Conference 2000 (QELS 2000) Technical Digest May 7-12, 2000 p. 225.*

(Continued)

Primary Examiner—Ellen Tran
(74) Attorney, Agent, or Firm—Oblon, Spivak, McClelland, Maier & Neustadt, P.C.

(57) ABSTRACT

In the method of the present invention, one of each pair of photons connected through entanglement is distributed to a transmitting station, relay stations and a receiving station. After the photons reach secure sites, such as the relay stations, a base for detecting photons is determined between adjacent sites, and then photons are detected in each site, which makes it possible to obtain a secret key used for secure information transmission between relay stations using bases coincide with each other every time. Also, in the present invention, a high-quality random number sequence serving as a secret key is automatically generated in a physical manner every time by detecting a superposition state of an entanglement and procedures corresponding to those in which a secret key itself is transmitted in a form of a quantum cryptogram are performed.

12 Claims, 3 Drawing Sheets

OTHER PUBLICATIONS

Quantum Electronics and Laser Science Conference 2002 QELS '02 Technical Digest Summaries Paper Presented 2002 by Daniel Gottesman, D.Bouwmeester, Geraldo A.Barbosa, Eric Corndorf, and Prem Kumar, Hai Wang, Davide J. Goorskey, and Min Xiao pp. 189-190.*

L.-M. Duan, et al., "Long-distance quantum communication with atomic ensembles and linear optics", Nature, vol. 414, Nov. 22, 2001, pp. 413-418.

H. J. Briegel, et al., "Quantum reapeaters: The Role of Imperfect Local Operations in Quantum Communication", Physical Review Letters, vol. 81, No. 26, Dec. 28, 1998, pp. 5932 to 5935.

Tal Mor, "Quantum Memory in Quantum Cryptography", [Online], [searched on Jun. 20, 2007], Internet<http://<ARXIV.ORG/PS_CACHE/QUANT-PH/PDF/9906/990673VL.PDF>, Jun. 21, 1999, pp. 30-31.

* cited by examiner

SECRET KEY DISTRIBUTION METHOD AND SECRET KEY DISTRIBUTION SYSTEM

CROSS-REFERENCE TO RELATED APPLICATIONS

This application is based upon and claims the benefit of priority from prior Japanese Patent Application No. 2003-370922, filed Oct. 30, 2003, the entire contents of which are incorporated herein by reference.

BACKGROUND OF THE INVENTION

1. Field of the Invention

The present invention relates to a secret key distribution method and a secret key distribution system that combine quantum communication in which information is put on a quantum state of a photon, making it almost impossible to eavesdrop, with a classic relay that temporarily converts the information transmitted in quantum communication into classic information and then transmits the relayed information in quantum communication again.

2. Description of the Related Art

In quantum cryptography communication, a quantum state of a photon is used to carry information so as to distribute a secret key safely, making use of the fact that duplication of the quantum state is theoretically impossible. The property of making duplication impossible offers a security advantage, but on the other hand, it means that amplification is impossible even if the photon is attenuated in a communication path, such as an optical fiber. Since relaying cannot be effected by simple signal amplification, the distance available for quantum cryptography communication is limited to the distance that a generated photon would be transmitted without attenuation. It is known that the distance is about 100 km in conventional techniques in the case where a transmission rate of about 10 bps is to be ensured.

Under the circumstances, research has been made to realize quantum cryptography communication over a long distance by generating quantum systems having quantum correlation called an entanglement at a long-distance from each other (see L. M. Duan, et al., Nature, 414, 413, 2001; Jpn. Pat. Appln. KOKAI Publication No. 11-346211; and Jpn. Pat. Appln. KOKAI Publication No. 2000-339387). To secure almost perfect or unconditional security, such a method is effective.

On the other hand, when the security of the relay station is regarded as being secured sufficiently judging from a necessary security level, the following method would be practicable and useful: That is, quantum communication is used in communication paths between relay stations, which are spread spatially and whose security is difficult to ensure. In each of the relay stations, the information transmitted in quantum communication is converted once into classic information and then relayed. Then, the relay stations transmit the information through quantum communication again.

In this case, a method would be considered in which quantum cryptography communication is performed between the first transmitting station and a relay station, between relay stations, and between a relay station and the last receiving station so as to send content of communication in itself to be transmitted in the form of quantum information between respective sites one after another. However, this method always requires quantum communication whenever cryptography communication is desired. In contrast, if only a secret key, i.e., a common random number table, has been shared beforehand, the secret key is used when the content of communication to be sent are encrypted, enabling a secure cryptogram to be sent via a classic transmission path easy to use anywhere, which is often convenient. Since normal communication via a classic transmission path is performed in this method, it offers the advantage of being capable of sending the content of communication to be sent at a high transmission rate at any time. Therefore, the secret key distribution method becomes important.

When a secret key distribution method without an entanglement frequently tested at present is tried directly in quantum communication between relay stations in distributing a long-distance communication secret key by way of classic relay stations, the following problem arises: that is, the number of secret keys decreases at a rate of ½ or less each time relaying is performed, regardless of the relay distance, making the relaying meaningless. This problem is attributed to the following reasons. In a secret key distribution method tested at present, in order to ensure security, random bases unrelated to one another are used when the secret key sender puts the key on a quantum state and transmits the key and when the receiver receives the transmitted key by detecting the quantum state. After the transmission and reception are completed, the sender and the receiver exchange information about the used bases via a classic communication path and use only the key whose bases have happened to coincide with each other. In this method, even if information about the bases used by the sender and receiver has leaked out, since the photon has already passed through the quantum transmission path (e.g., an optical fiber), such a type of eavesdropping that extracting the photon from the quantum transmission path and detecting the photon using the base to obtain information about the secret key and then generating a photon in the same quantum state and making the photon return to the quantum transmission path, cannot be done. However, since the bits whose bases have not coincided with each other are discarded in exchange of security, the number of secret keys is decreased each time relaying is performed as described above.

A method would also be considered in which a secret key for long-distance communication in itself is transmitted as content of classic communication to be sent using quantum cryptography communication between a transmitting station and a relay station, between relay stations, and a relay station and a receiving station. In this method, operations of sharing a secret key for long-distance communication using a quantum communication path and a classic communication path between relay stations, for example, and sending the secret key safely are repeated in succession between relay stations. In this case, each quantum cryptography communication between relay stations requires a random number table on which the secret key to be shared for the quantum cryptography communication between the relay stations is based, in addition to the random number table for selection of the base, thus consuming a large number of random number. Therefore, the problem is that a high-quality and efficient random number-generating mechanism has to be built in. Further, since it is necessary to use secret keys repeatedly, it is difficult to increase the transmission rate, unless the number of bits discarded wastefully is reduced.

As described above, when a secret key for long-distance communication is to be distributed by repeating secure quantum communication between relay stations in the case where security in the relay stations would be secured, there arise a problem that the number of secret keys is exponentially decreased each time relaying is performed, or a large number of high-quality random numbers must be generated efficiently. However, a simple of solving these problems has not been known.

BRIEF SUMMARY OF THE INVENTION

An object of the present invention is to provide a high-security secret key distribution method and system which realizes long-distance communication without decrease of the number of secret keys due to relaying, which is advantageous for increasing a transmission rate because of absence of waste of bits, and which contains a mechanism for generating high-quality random numbers efficiently.

According to an aspect of the present invention, there is provided a secret key distribution method of distributing two random number tables correlated to each other serving as a secret key between sites A and B between which an N number of relay stations R(i) (i=1, 2, ..., N) are located, comprising:

generating an N+1 number of photon pairs PP(j) (j=1, 2, ..., N+1) consisting of photons P1(j) and photons P2(j) connected through entanglement;

sending a photon P1(1) of the photon pair PP(1) to A and a photon P2(1) of the photon pair PP(1) to R(1), a photon P1(k) of the photon pair PP(k) to R(k−1) and a photon P2(k) of the photon pair PP(k) to R(k) (k=2, 3, ..., N), and a photon P1(N+1) of the photon pair PP(N+1) to R(N) and a photon P2(N+1) of the photon pair PP(N+1) to B;

determining a base for detecting a photon by exchanging information between A and R(1), between R(m) and R(m+1) (m=1, 2, ..., N−1), and between R(N) and B, after the individual photons reach A, R(i) and B, detecting photons connected through entanglement between A and R(1), between R(m) and R(m+1), and between R(N) and B by using the same base, respectively, acquiring a bit corresponding to the detected value of each photon depending on a predetermined correspondence, and setting the bit acquired by the detection of the photon P1(1) in A to be B(P1(1)), the bit acquired by the detection of the photon P2(i) in R(i) to be B(P2(i)), the bit acquired by the detection of the photon P1(i+1) to be B(P1(i+1)), and the bit acquired by the detection of the photon P2(N+1) in B to be B(P2(N+1));

causing R(1) to send to R(2) information C(1) as to whether to invert B(P2(2)) depending on B(P2(1)) and B(P1(2)), and causing R(2) to set B(P2(2)) to B(P2(2))' depending on C(1);

causing R(m) to send to R(m+1) information C(m) as to whether to invert B(P2(m+1)) depending on B(P2(m))' and B(P1(m+1)), and causing R(m+1) to set B(P2(m+1)) to B(P2(m+1))' depending on C(m), the operations are performed with respect to m=2, 3, ..., N−1 in that order;

causing R(N) to send to B information C(N) as to whether to invert B(P2(N+1)) depending on B(P2(N))' and B(P1(N+1)), and causing B to set B(P2(N+1)) to B(P2(N+1))' depending on C(N) so as to correlate the bit B(P1(1)) acquired in A to the bit B(P2(N+1))' acquired in B; and repeating procedures for acquiring bits correlated between A and B by the above operations as many times as necessary, and setting B(P1(1)) and B(P2(N+1))' acquired in a q-th procedure to be a q-th bit of the random number tables acquired in A and in B, respectively.

According to another aspect of the present invention, there is provided a secret key distribution method of distributing a random number table serving as a secret key between sites A and B between which an N number of relay stations R(i) (i=1, 2, ..., N) are located, comprising:

preparing a random number sequence BA(r) (r=1, 2, ...) in A;

generating an N+1 number of photon pairs PP(j) (j=1, 2, ..., N+1) consisting of photons P1(j) and photons P2(j) connected through entanglement;

sending a photon P1(1) of the photon pair PP(1) to A and a photon P2(1) of the photon pair PP(1) to R(1), a photon P1(k) of the photon pair PP(k) to R(k−1) and a photon P2(k) of the photon pair PP(k) to R(k) (k=2, 3, ..., N), and a photon P1(N+1) of the photon pair PP(N+1) to R(N) and a photon P2(N+1) of the photon pair PP(N+1) to B;

determining a base for detecting a photon by exchanging information between A and R(1), between R(m) and R(m+1) (m=1, 2, ..., N−1), and between R(N) and B, after the individual photons reach A, R(i) and B, detecting photons connected through entanglement between A and R(1), between R(m) and R(m+1), and between R(N) and B by using the same base, respectively, acquiring a bit corresponding to the detected value of each photon depending on a predetermined correspondence, and setting the bit acquired by the detection of the photon P1(1) in A to be B(P1(1)), the bit acquired by the detection of the photon P2(i) in R(i) to be B(P2(i)), the bit acquired by the detection of the photon P1(i+1) to be B(P1(i+1)), and the bit acquired by the detection of the photon P2(N+1) in B to be B(P2(N+1));

causing A to send to R(1) information C(A) as to whether to invert B(P2(1)) depending on a q-th bit BA(q) in the random number sequence BA(r) (r=1, 2, ...) and B(P1(1)), and causing R(1) to set B(P2(1)) to B(P2(1))' depending on C(A);

causing R(1) to send to R(2) information C(1) as to whether to invert B(P2(2)) depending on B(P2(1))' and B(P1(2)) and causing R(2) to set B(P2(2)) to B(P2(2))' depending on C(1);

causing R(m) to send to R(m+1) information C(m) as to whether to invert B(P2(m+1)) depending on B(P2(m))' and B(P1(m+1)), and causing R(m+1) to set B(P2(m+1)) to B(P2(m+1))' depending on C(m), the operations are performed with respect to m=2, 3, ..., N−1 in that order;

causing R(N) to send to B information C(N) as to whether to invert B(P2(N+1)) depending on B(P2(N))' and B(P1(N+1)), and causing B to set B(P2(N+1)) to B(P2(N+1))' depending on C(N) so as to correlate the q-th bit BA(q) in the random number sequence BA(r) prepared in A to the bit B(P2(N+1))' acquired in B; and repeating procedures for acquiring bits correlated between A and B by the above operations as many times as necessary, and distributing the random number sequence prepared in A to B.

According to still another aspect of the present invention, there is provided a secret key distribution system distributing two random number tables correlated to each other serving as a secret key between sites A and B between which an N number of relay stations R(i) (i=1, 2, ..., N) are located, comprising:

photon generating sections which are provided between A and R(1), between R(m) and R(m+1) (m=1, 2, ..., N−1) and between R(N) and B, and which generate photon pairs PP(1), PP(k) (k=2, 3, ..., N), and PP(N+1), respectively;

optical paths to send a photon P1(1) of the photon pair PP(1) to A and a photon P2(1) of the photon pair PP(1) to R(1), a photon P1(k) of the photon pair PP(k) to R(k−1) and a photon P2(k) of the photon pair PP(k) to R(k) (k=2, 3, ..., N), and a photon P1(N+1) of the photon pair PP(N+1) to R(N) and a photon P2(N+1) of the photon pair PP(N+1) to B, from the individual photon generating sections, respectively;

photon detecting sections, each including a delay line, a base-adjusting optical element and a photon detector, which are provided in each of A, R(i) and B to detect the photons P1(1), P2(1), P1(k), P2(k), P1(N+1), and P2(N+1) sent from the photon generating sections, respectively;

switching signal generators which generate a signal for switching the base for the base-adjusting optical elements to detect photons connected through entanglement using the same base between A and R(1), between R(m) and R(m+1) (m=1, 2, ..., N−1) and between R(N) and B; and data acquisition-calculation-storage units which are provided in each of A, R(i) and B, and which acquire detected values of the individual photons detected using a certain base in the photon detecting sections and store bits corresponding to the detected values depending on predetermined correspondence, the data acquisition-calculation-storage unit in each relay station being configured to perform calculation and send to a subsequent relay station or B information as to whether to invert one bit depending on two bits acquired in the relay station, and the data acquisition-calculation-storage unit to which the information is sent being configured to operate one bit.

According to still another aspect of the present invention, there is provided a secret key distribution system distributing a random number table serving as a secret key between sites A and B between which an N number of relay stations R(i) (i=1, 2, ..., N) are located, the secret key distribution system comprising:

photon generating sections which are provided between A and R(1), between R(m) and R(m+1) (m=1, 2, ..., N−1) and between R(N) and B, and which generate photon pairs PP(1), PP(k) (k=2, 3, ..., N), and PP(N+1), respectively;

optical paths to send a photon P1(1) of the photon pair PP(1) to A and a photon P2(1) of the photon pair PP(1) to R(1), a photon P1(k) of the photon pair PP(k) to R(k-1) and a photon P2(k) of the photon pair PP(k) to R(k) (k=2, 3, ..., N), and a photon P1(N+1) of the photon pair PP(N+1) to R(N) and a photon P2(N+1) of the photon pair PP(N+1) to B, from the individual photon generating sections, respectively;

photon detecting sections, each including a delay line, a base-adjusting optical element and a photon detector, which are provided in each of A, R(i) and B to detect the photons P1(1), P2(1), P1(k), P2(k), P1(N+1), and P2(N+1) sent from the photon generating sections, respectively;

switching signal generators which generate a signal for switching the base for the base-adjusting optical elements to detect photons connected through entanglement using the same base between A and R(1), between R(m) and R(m+1) (m=1, 2, ..., N−1) and between R(N) and B; and data acquisition-calculation-storage units which are provided in each of A, R(i) and B, and which acquire detected values of the individual photons detected using a certain base in the photon detecting sections and store bits corresponding to the detected values depending on predetermined correspondence, the data acquisition-calculation-storage unit in A being configured to perform calculation and send to a subsequent relay station information as to whether to invert one bit depending on a bit stored in A and a bit acquired in A, the data acquisition-calculation-storage unit in each relay station being configured to perform calculation and send to a subsequent relay station or B information as to whether to invert one bit depending on two bits acquired in the relay station, and the data acquisition-calculation-storage unit to which the information is sent from A or a relay station being configured to operate one bit.

DETAILED DESCRIPTION OF THE INVENTION

The principle of a secret key distribution method according to an embodiment of the present invention will be described.

Figure 1:
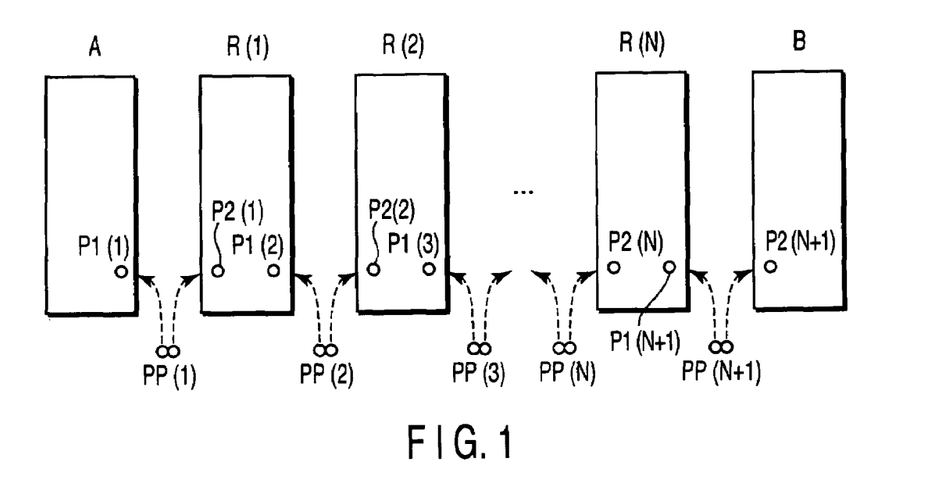
FIG. 1 is a schematic view showing positional relationship between a site A, relay stations, and a site B, photon pairs to be generated, and distribution of photons in a secret key distribution method according to the embodiments of the present invention.

FIG. 1 is a schematic view showing positional relationship between a site A (the first transmitting station), relay stations, and a site B (the last receiving station), photon pairs to be generated, and distribution of photons. As shown in FIG. 1, an N number of relay stations R(i) (i=1, 2, ..., N) are located between the sites A and B. In FIG. 1, a case will be considered where bits serving as a secret key are acquired one by one between the sites A and B, while relaying operations are performed between relay stations.

First, a procedure for acquiring a first bit will be described. As shown in FIG. 1, an N+1 number of photon pairs each connected through an entanglement are generated. Let each photon pair be PP(j)(j=1, 2, ..., N+1). Suppose each of the photon pairs is composed of photon P1(j) and photon P2(j). Every ones of each pair are distributed. Specifically, of the photon pair PP(1), a photon P1(1) is distributed to A and a photon P2(1) is distributed to R(1); of the photon pair PP(k), a photon P1(k) is distributed to R(k−1) and a photon P2(k) is distributed to R(k) (k=2, 3, ..., N); and of the photon pair PP(N+1), a photon P1(N+1) is distributed to R(N) and a photon P2(N+1) is distributed to B.

Next, after the photons reach A, R(i) and B, each base for detecting photons is determined between A and R(1), between R(m) and R(m+1) (m=1, 2, ..., N−1) and between R(N) and B. Even if this determination is made through an ordinary classic communication path, security is not impaired. The reason is that, even if the base is eavesdropped, the photon to be detected using that base has already arrived at secure A, B or R(i) and therefore the following attack cannot be made: the photon is extracted from somewhere in the middle of a quantum transmission path (e.g., an optical fiber), detection is made using the base to steal information about the secret key, and a photon is newly input to the quantum transmission path to prevent the eavesdropping from being discovered.

In the present invention, after photons enter secure sites, such as relay stations, information about which base should be used for detection is exchanged. Therefore, for example, the following method may be used. That is, as soon as one of a pair of photons enters a relay station, the photon is detected and thereafter the base used in detecting the photon is notified to the relay station where the other photon is retained. Although both photons may be retained in delay lines, retention of photons is not essential. For example, there may be a case where at least one of a pair of photons need not be retained. It is desirable that photons should not be retained, if possible.

Each photon that has arrived at A, B or R(i) is detected using the base determined after the arrival, and is converted into a bit based on correspondence predetermined for the detected values. In this way, the first bit is acquired in each of A, B and R(i). The resultant bit in this operation has a value acquired as a result that a wave packet of a wave function is probabilistically contracted by detection of a superposition state called an entanglement. Since the value is a result of a totally probabilistic process from a physical viewpoint, high-quality random numbers are acquired without particularly providing a random number table and a random number generating unit. In addition, although detected values for individual photons constituting a photon pair cannot be predicted, there is a correlation between the detected values of the two photons on the basis of entanglements.

Figure 2:
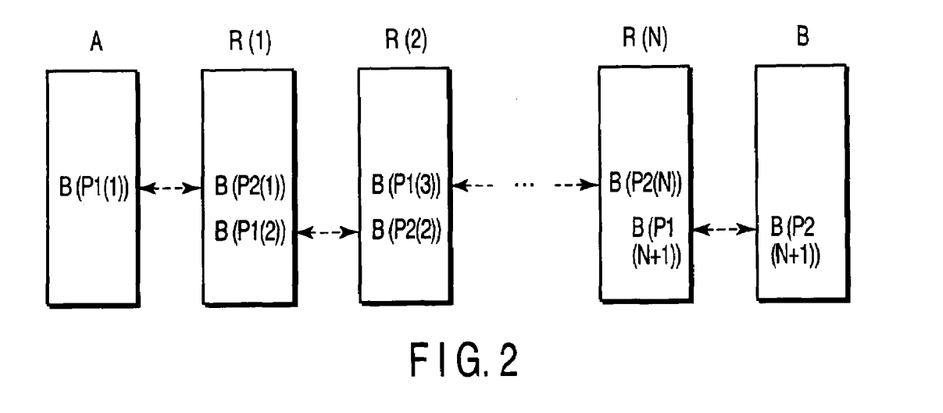
FIG. 2 is a schematic view showing bits which are acquired-first in A, R(i) and B, respectively, in the secret key distribution method according to the embodiments of the present invention.

FIG. 2 shows the bits acquired first in A, R(i) and B. As shown in FIG. 2, let a bit acquired by detecting the photon P1(1) in A be B(P1(1)), a bit acquired by detecting the photon P2(i) in R(i) be B(P2(i)), a bit acquired by detecting the photon P1(i+1) be B(P1(i+1)), and a bit acquired by detecting the photon P2(N+1) in B be B(P1(N+1)). In FIG. 2, the arrows shown by broken lines indicate that there is a correlation between the results of detection, or the acquired bits.

B(P2(i)), B(P1(i+1)) and B(P1(N+1)) correspond to secret keys in quantum cryptography. Use of these secret keys permits the first relay station R(1) to send the bit in A to R(2) using the secure secret key, and permits R(2) to send the bit to R(3). In this way, the bit can be sent to B successively. However, in the method according the embodiments of the present invention, information encoded with a secret key is transmitted to other party, and the other party operates the secret key on the basis of the encoded information to convert it to information to be sent. That is, this differs from the conventional method of sending information encoded with a secret key and decoding the encoded information with other party's secret key.

Figure 3:
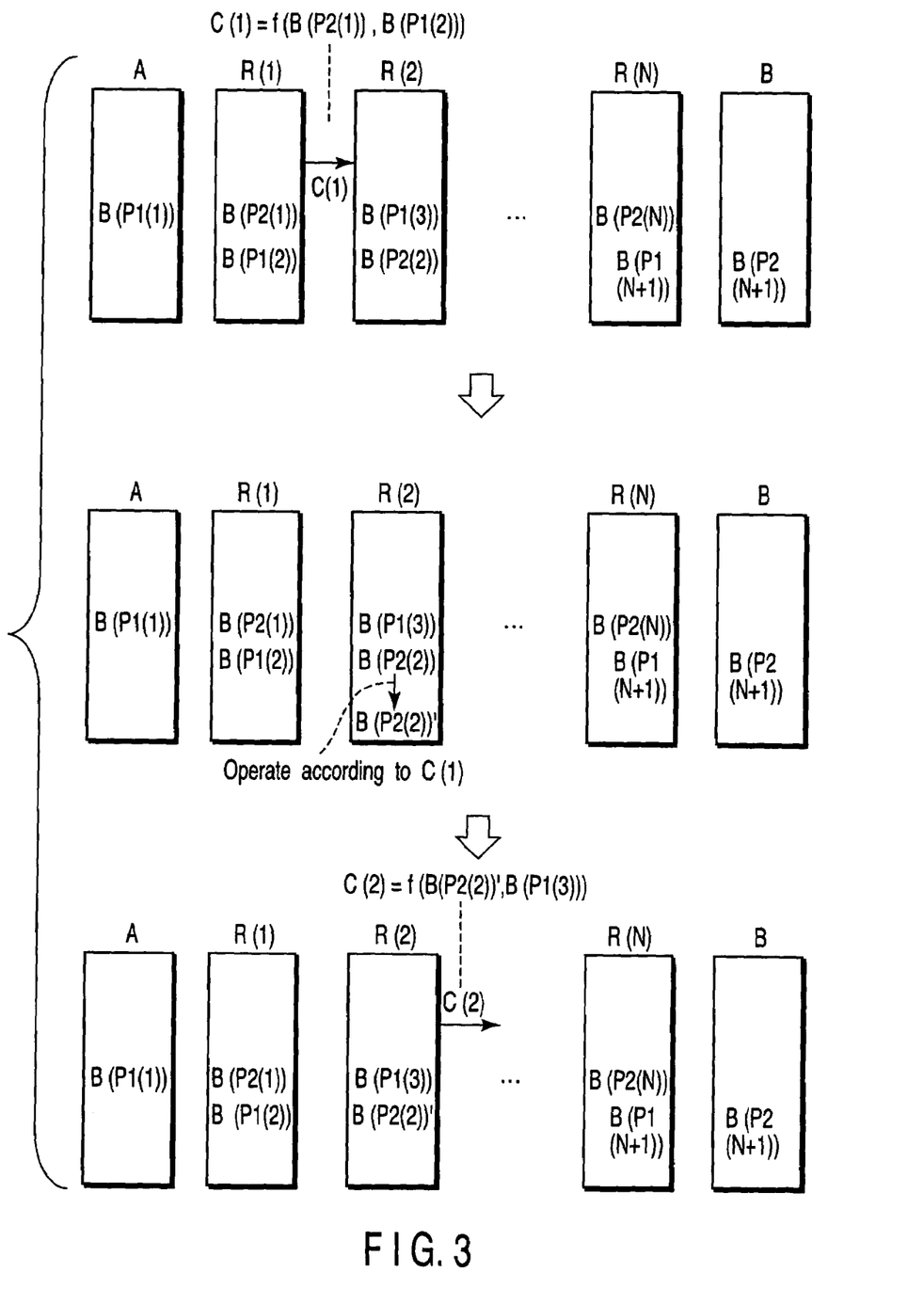
FIG. 3 is a schematic view to explain operations performed in relay stations in the secret key distribution method according to the embodiments of the present invention.

Referring to FIG. 3, operations actually performed in relay stations will be described. As shown in the upper part of FIG. 3, R(1) sends information C(1) as to whether to invert B(P2(2)) depending on a predetermined rule on the basis of B(P2(1)) and B(P1(2)), which is expressed here as C(1)=f(B(P2(1)), B(P1(2))), to the next relay station R(2) by way of a classic transmission path. As shown in the middle of FIG. 3, R(2) inverts B(P2(2)) or remains B(P2(2)) unchanged without inverting it depending on C(1) to set it to B(P2(2))'. As shown in the lower part of FIG. 3, R(2) sends information C(2) as to whether to invert B(P2(3)) depending on a predetermined rule on the basis of B(P2(2)') and B(P1(3)), which is expressed here as C(2)=f(B(P2(2)'), B(P1(3))), to the next relay station R(3) by way of the classic transmission path.

In general, R(m) (m=1, 2, ..., N−1) sends information C(m) as to whether to invert bit B(P2(m+1)) to the next relay station R(m+1) depending on B(P2(m))' and B(P1(m+1)), and R(m+1) inverts B(P2(m+1)) or remains B(P2(m+1)) unchanged without inverting it depending on C(m) to set it to B(P2(m+1))'. Finally, the last relay station R(N) sends information C(N) as to whether to invert the bit B(P2(N+1)) to B depending on B(P2(N))' and B(P1(N+1)), and B inverts B(P2(N+1)) or remains B(P2(N+1)) unchanged without inverting it depending on C(N) to set it to B(P2(N+1))'.

The above operations correspond to a certain relay station encrypting the bit in A or in a preceding relay station followed by sending the resulting bit to the next relay station or B. These operations are performed between R(m) and R(m+1) in the order of m=1, 2, ..., N−1, and finally between R(N) and B, which means that the bit information in A is sent to B. Even when information C(m) or C(N) in these operations is sent through a classic transmission path, no information is given to an eavesdropper, assuring the security of the information.

In such a manner as described above, A and B can acquire the first bit. The procedures for acquiring bits correlated to each other between A and B are repeated by the above processes as many times as necessary. Then, let B(P1(1)) and B(P2(N+1))' acquired in the q-th procedure be the q-th bit in the random number tables acquired in A and B. Repeating such a procedure L times enables L-bit random number sequences correlated to one another to be generated in A and B. The relationship between two random number sequences is determined by the correspondence determined between the detected value and the bit in A, R(i) and B and by the correspondence determined between the bit acquired in the respective sites and C(m), C(N) and C(A) to be sent to the next site depending on the bit.

According to the secret key distribution method of the embodiments of the present invention, the following effects are produced. In this method, individual photons constituting photon pairs connected through an entanglement are distributed to the first transmitting station, the relay stations, and the last receiving station. After the photons reach secure areas, such as the relay stations, the base for detecting photons is determined between the transmitting station, the relay stations, and the receiving station adjacent to one another, and then the photons are detected in each site. Such a method enables to acquire a secret key used for secure information transmission between relay stations using bases that coincide with each other every time, instead of waiting for accidental coincidence as in the prior art. In addition, high-quality random numbers serving as secret keys can be generated automatically in a physical manner by detecting a superposition state of an entanglement. Moreover, instead of relaying only the procedures for secret key distribution in conventional quantum cryptography communication via relay stations in a classic manner, the procedures corresponding to sending secret keys themselves with a type of quantum cryptography can be adopted. Therefore, when secure quantum communication between relay stations is repeated to perform secret key distribution over a long distance, it is possible to increase the distance without decreasing the number of secret keys due to relaying. Furthermore, since secret keys needed for each relay are generated automatically by the built-in, high-quality physical random number generating mechanism as well as there is no bit discarded wastefully in generating the secret keys, it is advantageous to improve a transmission rate.

Next, correspondence between a detected value of a photon and a bit to be acquired and information as to whether to invert the bit which is sent from one relay station to another will be described using an example.

Now, suppose that two detected values observed when the photons constituting PP(j) are detected using a certain base 1 are S1 and S2, and a N+1 number of photon pairs PP(j) are expressed by:

$$\phi 1(j, S1)\phi 2(j, S2)+\exp(i\theta)\phi 1(j, S2)\phi 2(j, S1),$$

where θ is a given real number, using two eigenstates φ1(j, S1) and φ1(j, S2) perpendicular to each other of photon P1(j) and two eigenstates φ2(j, S1) and φ2(j, S2) perpendicular to each other of photon P2(j).

In addition, suppose that, for example, a common base used in the detection of the photons between A and R(1), between R(m) and R(m+1), and between R(N) and B is set to the base 1 or another base 2 not perpendicular to the base 1, and the correspondence between the detected values of the individual photons and the bits to be acquired is set in such a manner that, when the detection is performed using the base 1, a bit in the case where S1 is detected is set to be 0 and a bit in the case where S2 is detected is set to be 1, and that, when the detection is performed using the base 2, supposing that two detected values observed when the photons are detected using the base 2 are S1' and S2', a bit in the case where S1' is detected is set to be 0 and a bit in the case where S2' is detected is set to be 1.

Furthermore, R(1) sends to R(2) information C(1) that B(P2(2)) is not to be inverted if B(P2(1)) and B(P1(2)) are the same, but sends information C(1) that B(P2(2)) is to be inverted if B(P2(1)) and B(P1(2)) are different from each other, and then R(2) sets B(P2(2)) to B(P2(2))' depending on C(1). Similarly, R(m) sends to R(m+1) information C(m) that B(P2(m+1)) is not to be inverted if B(P2(m))' and B(P1(m+1)) are the same, but sends information C(m) that B(P2(m+1)) is to be inverted if B(P2(m))' and B(P1(m+1)) are different from each other, and then R(m+1) sets B(P2(m+1)) to B(P2(m+1))' depending on C(m). These operations are performed in that order for m=2, 3, . . . , N−1. Furthermore, R(N) sends to B information C(N) that B(P2(N+1)) is not to be inverted if B(P2(N))' and B(P1(N+1)) are the same, but sends information C(N) that B(P2(N+1)) is to be inverted if B(P2(N))' and B(P1(N+1)) are different from each other, and then B sets B(P2(N+1)) to B(P2(N+1))' depending on C(N). In this way, the method according to the embodiments of the present invention can be carried out.

The above description covers the case where bits are acquired which are generated automatically in A and B in a probabilistic manner. However, in the embodiments of the present invention, a random number sequence BA(r) (r=1, 2, . . . ) may be prepared in A beforehand and a random number sequence correlated to the random number BA(r) may be acquired in B.

In this case, let a bit acquired by detection of the photon P1(1) in A be B(P1(1)), a bit acquired by detection of the photon P2(i) in R(i) be B(P2(i)), a bit acquired by detection of the photon P1(i+1) be B(P1(i+1)), and a bit acquired by detection of the photon P2(N+1) in B be B(P2(N+1)). Then, first, A sends to R(1) information C(A) as to whether to invert B(P2(1)) depending on the q-th bit BA(q) in the random number sequence BA(r) (r=1, 2, . . . ) and B(P1(1)), and R(1) sets B(P2(1)) to B(P2(1))' depending on C(A). Thereafter, by repeating the above operations, a random number sequence correlated to the random number sequence BA(r) prepared in A can be acquired in B.

EMBODIMENTS

Hereinafter, embodiments of the present invention will be described referring to the accompanying drawings.

First Embodiment

Figure 4:
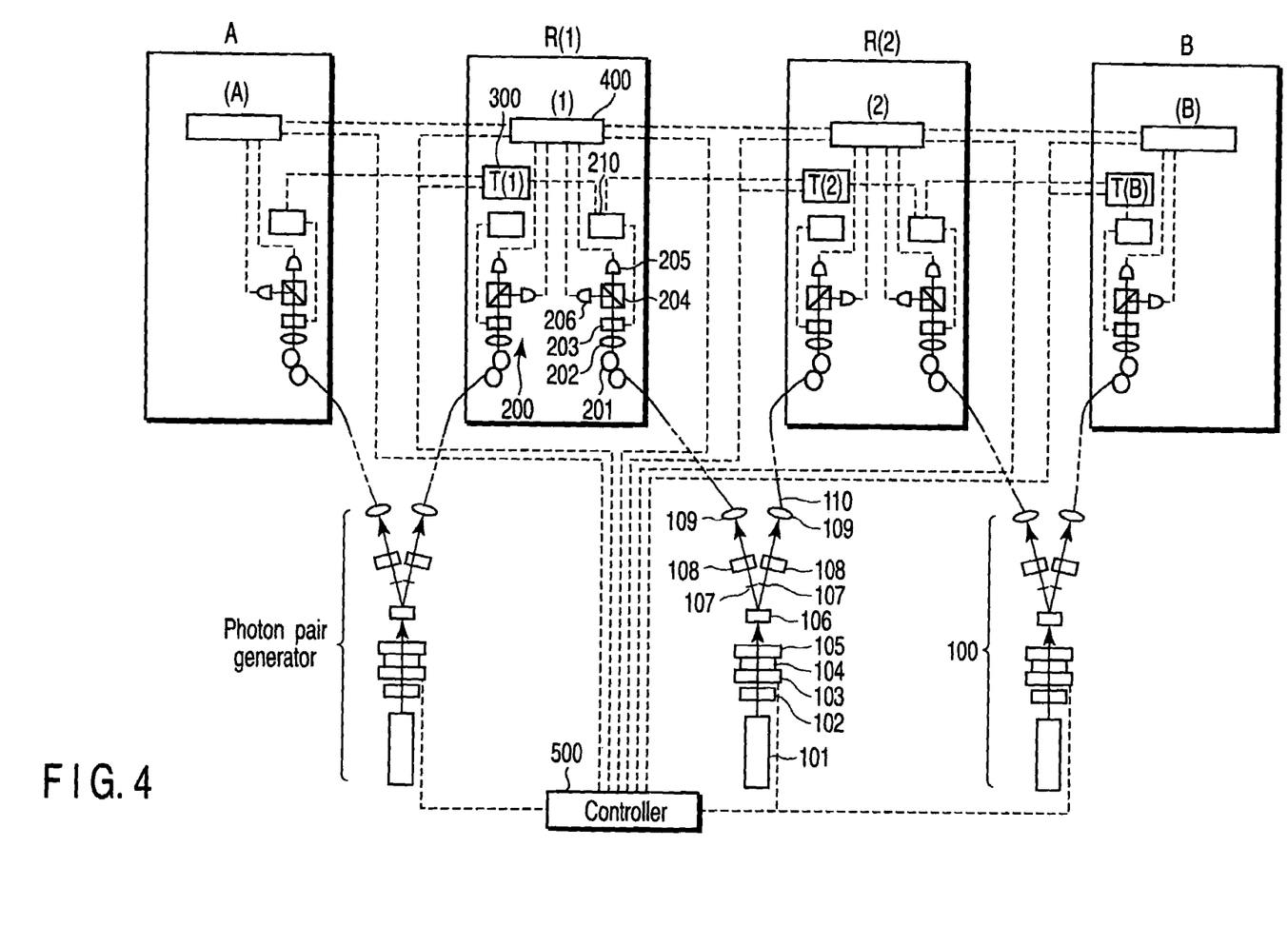
FIG. 4 shows the construction of the secret key distribution system according to a first embodiment of the present invention.

FIG. 4 shows the construction of the secret key distribution system according to a first embodiment of the present invention. FIG. 4 shows a case where two relay stations R(1), R(2) are located between sites A and B. Suppose these four sites A, R(1), R(2) and B are arranged in a straight line at intervals of 1 km. A photon pair generator 100 for generating photon pairs connected through an entanglement is provided between A and R(1), between R(1) and R(2), and between R(2) and B. Let these photon pair generators be PPG(1), PPG(2), and PPG(3).

Each of the photon pair generators 100 includes an argon ion laser 101 with a wavelength of 351.1 nm, an ND filter 102, a shutter 103 using an electro-optic modulator, a half-wave plate 104, a quarter-wave plate 105, a 0.6-mm-thick nonlinear BBO (β-barium borate) crystal 106, an iris diaphragm 107, a half-wave plate 108, and a lens 109.

The argon ion laser 101 emits light. The ND filter 102 adjusts intensity of the light. The shutter 103 segments the light into a light pulse train with a pulse width of about 2 nanoseconds and a repetition frequency of 100 Hz. The half-wave plate 104 and quarter-wave plate 105 adjust polarized light. The BBO crystal 106 is irradiated with the polarized light. In this way, laser light from the argon ion laser is irradiated with the BBO crystal 106 under type II phase matching, thereby generating photon pairs of 702 nm connected through an entanglement, by down-conversion through a parametric process. At this time, the ND filter 102 is adjusted to achieve an intensity at which about one photon pair is generated for each pulse.

Let the photon pair generated in the photon pair generator between A and R(1), that between R(1) and R(2), and that between R(2) and B be PP(1), PP(2), and PP(3), respectively. Let two photons with a wavelength of 702 nm constituting PP(u) be P1(u) and P2(u) (u=1, 2, 3). At this time, the two-photon state φ(u) of P1(u) and P2(u) is in a state connected through an entanglement expressed by the following equation (1):

$$\phi(u)=\phi1(u, V)\phi2(u, H)+\exp(i\theta)\phi1(u, H)\phi2(u, V) \quad (\text{eq. 1}),$$

where θ is a real number, φ1(u, H) indicates a state that the polarization angle of P1(u) is 0°, φ1(u, V) indicates a state that the polarization angle of P1(u) is 90°, φ2(u, H) indicates a state that the polarization angle of P2(u) is 0°, and φ2(u, V) indicates a state that the polarization angle of P2(u) is 90°.

The light flux generated by parametric down conversion is collimated by the iris diaphragm 107, thereby extracting photons P1(u), P2(u) (u=1, 2, 3). The polarized light adjusted by the half-wave plate 108 is focused by the lens 109, which is then introduced into the optical fiber 110. Then, P1(1) is led to A, P2(1) to R(1), P1(2) to R(1), P2(2) to R(2), P1(3) to R(2), and P2(3) to B.

In each of A, R(1) R(2), and B, there is provided a photon detecting section 200 for detecting a photon. Let these photon detecting sections be DP1(1), DP2(1), DP1(2), DP2(2), DP1(3), and DP2(3).

Each of the photon detecting sections 200 includes a 10-km-long optical fiber delay line 201, a lens 202, a polarizer 203 using an electro-optic modulator as a base adjusting optical element, a polarization beam splitter (PBS) 204, and two photon detectors 205, 206 provided at two outlets of the polarization beam splitter 204. The optical fiber delay line 201 is provided in such a manner that the change of the polarization state caused by the bend and the twist is compensated for on the whole so that the polarization state of the photon when it emerges from the end of the optical fiber may become the same as that of the incident photon. The photon emerging from the end of the optical fiber of the optical fiber delay line 201 is focused by the lens 202, and then is transmitted to the polarizer 203 using an electro-optic modulator.

The polarizer 203 can change the base of polarization detection to 0°/90° or to −45°/45° depending on an applied voltage from a driver. The photon, having passed through the polarizer 203, is caused to pass through the polarization beam splitter 204 and is detected by the photon detector 205 or 206.

The switching of the base by the polarizer 203 is effected by a switching signal to a driver 210 provided for each polarizer 203. The switching signal is generated by a switching signal generator 300 provided for each of R(1), R(2) and B. Let these switching signal generators be T(1), T(2) and T(3).

Figure 5:
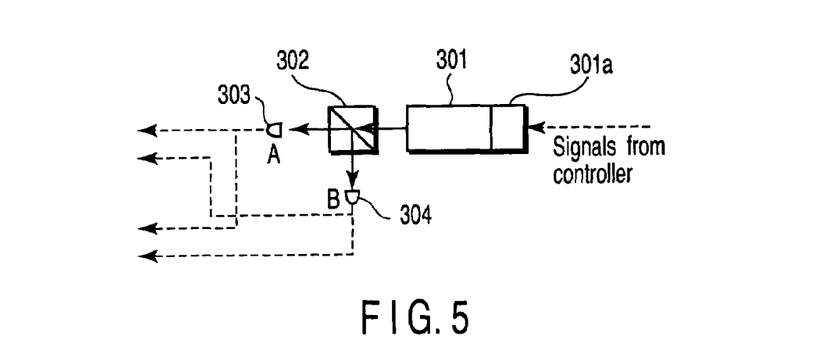
FIG. 5 shows the construction of the switching signal generator according to the first embodiment.

FIG. 5 shows the construction of the switching signal generator 300. The switching signal generator 300 includes a semiconductor laser 301 with a power supply and a driver section 301a, a 50%-50% beam splitter 302, a photon detector (A) 303 provided at one outlet of the beam splitter 302, and a photon detector (B) 304 provided at the other outlet. The pulse light from the semiconductor laser is weakened by the ND filter so as to be regarded as almost a single pulse light source.

Let the polarizers 203 using electro-optic effect determining the base in detecting the aforementioned photons P1(1), P2(1), P1(2), P2(2), P1(3) and P2(3) be E01(1), E02(1), E01(2), E02(2), E01(3) and E02(3), respectively. In FIG. 4, the switching signal generator T(1) sends a signal to the drivers 210 so as to switch the bases for E01(1) and E02(1). The switching signal generator T(2) sends a signal to the drivers 210 so as to switch the bases for E01(2) and E02(2). The switching signal generator T(B) sends a signal to the drivers 210 so as to switch the bases for E01(3) and E02(3). For example, when the photon detector (A) 303 has detected a photon, the switching signal generator 300 generates a switching signal so as to perform detection using the bases of 0°/90°. When the photon detector (B) 304 has detected a photon, the switching signal generator 300 generates a switching signal so as to perform detection using the bases of −45°/45°. Then, the driver 210 operates the polarizer 203 using electro-optic effect.

In each of A, R(1), R(2) and B, there is provided a high-speed data acquisition-calculation-storage unit 400. Let these data acquisition-calculation-storage units be (A), (1), (2) and (B). The data acquisition-calculation-storage unit 400 takes a detected value of a photon detected using a certain base from the photon detecting section 200, acquires the corresponding bit depending on predetermined correspondence, and stores the bit. An example of the correspondence at that time is shown in Table 1.

TABLE 1

| Base | Detected value | Bit |
| --- | --- | --- |
| 0° and 90° | 0° | 0 |
| −45° and 45° | −45° | 0 |
| 0° and 90° | 90° | 1 |
| −45° and 45° | 45° | 1 |

The data acquisition-calculation-storage unit (A) stores the detection result of the polarized light P1(1) as a bit B(P1(1)). The data acquisition-calculation-storage unit (1) stores the detection result of the polarized light P2(1) as a bit B(P2(1)) and the detection result of the polarized light P1(2) as a bit B(P1(2)). The data acquisition-calculation-storage unit (2) stores the detection result of the polarized light P2(2) as a bit B(P2(2)) and the detection result of the polarized light P1(3) as a bit B(P1(3)). The data acquisition-calculation-storage unit (B) stores the detection result of the polarized light P2(3) as a bit B(P2(3)).

A signal line connects between the data acquisition-calculation-storage units (A) and (1). A signal line connects between the data acquisition-calculation-storage units (1) and (2). A signal line connects between the data acquisition-calculation-storage units (2) and (B). The data acquisition-calculation-storage unit (1) is so configured that, if B(P2(1)) and B(P1(2)) are the same, it sends to the data acquisition-calculation-storage unit (2) an instruction that "set B(P2(2)) as it is to B(P2(2))' without inverting the bit of B(P2(2))", and that, if B(P2(1)) and B(P1(2)) differ from each other, it sends to the data acquisition-calculation-storage unit (2) an instruction that "invert the bit of B(P2(2)) and set it to B(P2(2))'". The data acquisition-calculation-storage unit (2) is so configured that, if B(P2(2))' and B(P1(3)) are the same, it sends to the data acquisition-calculation-storage unit (B) an instruction that "set B(P2(3)) as it is to B(P2(3))' without inverting the bit of B(P2(3))", and that, if B(P2(2))' and B(P1(3)) differ from each other, it sends to the data acquisition-calculation-storage unit (B) an instruction that "invert the bit of B(P2(3)) and set it to B(P2(3))'".

The operation timing of the shutter 103 in each of the photon pair generator 100, switching signal generator 300, and data acquisition-calculation-storage unit 400 is controlled by a controller 500.

An example of procedures for using the secret key distribution system shown in FIGS. 4 and 5 to obtain a common random number table at A and B will be described. First, photon pairs PP(u) connected through an entanglement were generated in the individual photon pair generators 100 at the same time. At a time two μs after photons P1(u) and P2(u) constituting the photon pair PP(u) reached A, R(1), R(2) and B, each of the switching signal generators 300 were operated to transmit a switching signal to the polarizers 203 using electro-optic effect in the respective photon detecting sections 200. At a time 30 μs after the generation of photon pairs, the base for the polarizer 203 and the detected value of the photon detected by the photon detector 205 or 206 were stored in the corresponding data acquisition-calculation-storage unit 400. Next, the data acquisition-calculation-storage units (1), (2), and (B) were operated in this order. Finally, bit B(P1(1)) was acquired in A and bit B(P2(3))' was acquired in B. By the same operations as described above, the procedure for obtaining a bit was repeated ten times to record the acquired B(P1(1)) and B(P2(3))' sequentially and produce a sequence of numbers. Both of A and B produced "1, 1, 0, 0, 1, 0, 0, 1, 1, 0" and therefore a common random number table was acquired. Here, the data when no photon was detected at the time that a photon was to be detected was discarded. That round was not counted and was tried again.

Second Embodiment

A sequence of numbers "0, 1, 1, 0, 1, 1, 0, 0, 0, 1" was stored beforehand as random number sequence BA(r) (r=1, 2, ..., 10) in the data acquisition-calculation-storage unit (A) in the first embodiment. In the q-th operation to obtain correlated bits in A and B, the data acquisition-calculation-storage unit (A) was configured as follows. That is, the data acquisition-calculation-storage unit (A) is so configured that, if BA(q) and B(P1(1)) differ from each other, it sends to the data acquisition-calculation-storage unit (1) an instruction that "set B(P2(1)) as it is to B(P2(1))' without inverting the bit of B(P2(1))", and that, if BA(q) and B(P1(1)) are the same, it sends to the data acquisition-calculation-storage unit (1) an instruction that "invert the bit of B(P2(1)) and set it to B(P2(1))'". In addition, as in the first embodiment, the data acquisition-calculation-storage unit (1) is so configured that, if B(P2(1))' and B(P1(2)) are the same, it sends to the data acquisition-calculation-storage unit (2) an instruction that "set B(P2(2) as it is to B(P2(2))' without inverting the bit of B(P2(2))" and that, if B(P2(1))' and B(P1(2)) differ from each other, it sends to the data acquisition-calculation-storage unit (2) an instruction that "invert the bit of B(P2(2)) and set it to B(P2(2))'". The configuration of the data acquisition-calculation-storage unit (2) is the same as in the first embodiment. With such a manner, the procedures of obtaining bits correlated to each other in A and B were repeated ten times. The acquired B(P2(3))' was recorded sequentially, which produced the same sequence of numbers "0, 1, 1, 1, 1, 1, 0, 0, 0, 1"as BA(r). That is, the random number sequence prepared beforehand in A could be shared with B.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A secret key distribution method of distributing two random number tables correlated to each other serving as a secret key between sites A and B between which an N number of relay stations R(i) (i=1, 2, . . . , N) are located, the secret key distribution method comprising:

generating an N+1 number of photon pairs PP(j) (j=1, 2, . . . , N+1) consisting of photons P1(j) and photons P2(j) connected through entanglement;

sending a photon P1(1) of the photon pair PP(1) to A and a photon P2(1) of the photon pair PP(1) to R(1), a photon P1(k) of the photon pair PP(k) to R(k−1) and a photon P2(k) of the photon pair PP(k) to R(k) (k=2, 3, . . . , N), and a photon P1(N+1) of the photon pair PP(N+1) to R(N) and a photon P2(N+1) of the photon pair PP(N+1) to B;

determining a base for detecting a photon by exchanging information between A and R(1), between R(m) and R(m+1) (m=1, 2, . . . , N−1), and between R(N) and B, after the individual photons reach A, R(i) and B, detecting photons connected through entanglement between A and R(1), between R(m) and R(m+1), and between R(N) and B by using the same base, respectively, acquiring a bit corresponding to the detected value of each photon depending on a predetermined correspondence, and setting the bit acquired by the detection of the photon P1(1) in A to be B(P1(1)), the bit acquired by the detection of the photon P2(i) in R(i) to be B(P2(i)), the bit acquired by the detection of the photon P1(i+1) to be B(P1(i+1)), and the bit acquired by the detection of the photon P2(N+1) in B to be B(P2(N+1));

causing R(1) to send to R(2) information C(1) as to whether to invert B(P2(2)) depending on B(P2(1)) and B(P1(2)), and causing R(2) to set B(P2(2)) to B(P2(2))' depending on C(1);

causing R(m) to send to R(m+1) information C(m) as to whether to invert B(P2(m+1)) depending on B(P2(m))' and B(P1(m+1)), and causing R(m+1) to set B(P2(m+1)) to B(P2(m+1))' depending on C(m), the operations are performed with respect to m=2, 3, . . . , N−1 in that order;

causing R(N) to send to B information C(N) as to whether to invert B(P2(N+1)) depending on B(P2(N))' and B(P1(N+1)), and causing B to set B(P2(N+1)) to B(P2(N+1))' depending on C(N) so as to correlate the bit B(P1(1)) acquired in A to the bit B(P2(N+1))' acquired in B; and repeating procedures for acquiring bits correlated between A and B by the above operations as many times as necessary, and setting B(P1(1)) and B(P2(N+1))' acquired in a q-th procedure to be a q-th bit of the random number tables acquired in A and in B, respectively.

2. The method according to claim 1, wherein, supposing that two detected values observed when the photons constituting PP(j) are detected using a certain base are S1 and S2, and the N+1 number of photon pairs PP(j) are expressed by:

$$\phi1(j, S1)\phi2(j, S2)+\exp(i\theta)\phi1(j, S2)\phi2(j, S1),$$

where θ is a given real number, using two eigenstates φ1(j, S1) and φ1(j, S2) perpendicular to each other of photon P1(j) and two eigenstates φ2(j, S1) and φ2(j, S2) perpendicular to each other of photon P2(j), which are based on the base 1;

setting a common base used in the detection of the photons between A and R(1), between R(m) and R(m+1), and between R(N) and B to the base 1 or another base 2 not perpendicular to the base 1, and setting the correspondence between the detected values of the individual photons and the bits to be acquired in such a manner that, when the detection is performed using the base 1, a bit in the case where S1 is detected is set to be 0 and a bit in the case where S2 is detected is set to be 1, and that, when the detection is performed using the base 2, supposing that two detected values observed when the photons are detected using the base 2 are S1' and S2', a bit in the case where S1' is detected is set to be 0 and a bit in the case where S2' is detected is set to be 1;

causing R(1) to send to R(2) information C(1) that "do not invert B(P2(2))", if B(P2(1)) and B(P1(2)) are the same, and that "invert B(P2(2))", if B(P2(1)) and B(P1(2)) differ from each other, and causing R(2) to set B(P2(2)) to B(P2(2))' depending on C(1);

causing R(m) to send to R(m+1) information C(m) that "do not invert B(P2(m+1))", if B(P2(m))' and B(P1(m+1)) are the same, and that "invert B(P2(m+1))", if B(P2(m))' and B(P1(m+1)) differ from each other, and causing R(m+1) to set B(P2(m+1)) to B(P2(m+1))' depending on C(m), the operations are performed with respect to m=2, 3, . . . , N−1 in that order; and causing R(N) to send to B information C(N) that "do not invert B(P2(N+1))", if B(P2(N))' and B(P1(N+1)) are the same, and that "invert B(P2(N+1))", if B(P2(N))' and B(P1(N+1)) differ from each other, and causing B to set B(P2(N+1)) to B(P2(N+1))' depending on C(N).

3. The method according to claim 1, wherein, after the individual photons reach A, R(i) and B and until the base used in the detection of the photons is determined by exchanging information between A and R(1), between, R(1) and R(2), between R(m) and R(m+1) (m=2, 3, . . . , N−1) and between R(N) and B, and then the detection is performed, the photons are retained in delay lines provided in A, R(1), R(m) and B.

4. A secret key distribution method of distributing a random number table serving as a secret key between sites A and B between which an N number of relay stations R(i) (i=1, 2, . . . , N) are located, the secret key distribution method comprising:

preparing a random number sequence BA(r) (r=1, 2, . . . ) in A;

generating an N+1 number of photon pairs PP(j) (j=1, 2, . . . , N+1) consisting of photons P1(j) and photons P2(j) connected through entanglement;

sending a photon P1(1) of the photon pair PP(1) to A and a photon P2(1) of the photon pair PP(1) to R(1), a photon P1(k) of the photon pair PP(k) to R(k−1) and a photon P2(k) of the photon pair PP(k) to R(k) (k=2, 3, . . . , N), and a photon P1(N+1) of the photon pair PP(N+1) to R(N) and a photon P2(N+1) of the photon pair PP(N+1) to B;

determining a base for detecting a photon by exchanging information between A and R(1), between R(m) and R(m+1) (m=1, 2, . . . , N−1), and between R(N) and B, after the individual photons reach A, R(i) and B, detecting photons connected through entanglement between A and R(1), between R(m) and R(m+1), and between R(N) and B by using the same base, respectively, acquiring a bit corresponding to the detected value of each photon depending on a predetermined correspondence, and setting the bit acquired by the detection of the photon P1(1) in A to be B(P1(1)), the bit acquired by the detection of the photon P2(i) in R(i) to be B(P2(i)), the bit acquired by the detection of the photon P1(i+1) to be B(P1(i+1)), and the bit acquired by the detection of the photon P2(N+1) in B to be B(P2(N+1));

causing A to send to R(1) information C(A) as to whether to invert B(P2(1)) depending on a q-th bit BA(q) in the random number sequence BA(r) (r=1, 2, . . . ) and B(P1(1)), and causing R(1) to set B(P2(1)) to B(P2(1))' depending on C(A);

causing R(1) to send to R(2) information C(1) as to whether to invert B(P2(2)) depending on B(P2(1))' and B(P1(2)) and causing R(2) to set B(P2(2)) to B(P2(2))' depending on C(1);

causing R(m) to send to R(m+1) information C(m) as to whether to invert B(P2(m+1)) depending on B(P2(m))' and B(P1(m+1)), and causing R(m+1) to set B(P2(m+1)) to B(P2(m+1))' depending on C(m), the operations are performed with respect to m=2, 3, . . . , N−1 in that order;

causing R(N) to send to B information C(N) as to whether to invert B(P2(N+1)) depending on B(P2(N))' and B(P1(N+1)), and causing B to set B(P2(N+1)) to B(P2(N+1))' depending on C(N) so as to correlate the q-th bit BA(q) in the random number sequence BA(r) prepared in A to the bit B(P2(N+1))' acquired in B; and repeating procedures for acquiring bits correlated between A and B by the above operations as many times as necessary, and distributing the random number sequence prepared in A to B.

5. The method according to claim 4, wherein, supposing that two detected values observed when the photons constituting PP(j) are detected using a certain base 1 are S1 and S2, and the N+1 number of photon pairs PP(j) are expressed by:

$\phi 1(j, S1)\phi 2(j, S2)+\exp(i\theta)\phi 1(j, S2)\phi 2(j, S1)$, where θ is a given real number, using two eigenstates φ1(j, S1) and φ1(j, S2) perpendicular to each other of photon P1(j) and two eigenstates φ2(j, S1) and φ2(j, S2) perpendicular to each other of photon P2(j), which are based on the base 1;

setting a common base used in the detection of the photons between A and R(1), between R(m) and R(m+1), and between R(N) and B to the base 1 or another base 2 not perpendicular to the base 1, and setting the correspondence between the detected values of the individual photons and the bits to be acquired in such a manner that, when the detection is performed using the base 1, a bit in the case where S1 is detected is set to be 0 and a bit in the case where S2 is detected is set to be 1, and that, when the detection is performed using the base 2, supposing that two detected values observed when the photons are detected using the base 2 are S1' and S2', a bit-in the case where S1' is detected is set to be 0 and a bit in the case where S2' is detected is set to be 1;

causing R(1) to send to R(2) information C(1) that "do not invert B(P2(2))", if B(P2(1)) and B(P1(2)) are the same, and that "invert B(P2(2))", if B(P2(1)) and B(P1(2)) differ from each other, and causing R(2) to set B(P2(2)) to B(P2(2))' depending on C(1);

causing R(m) to send to R(m+1) information C(m) that "do not invert B(P2(m+1))", if B(P2(m))' and B(P1 (m+1)) are the same, and that "invert B(P2(m+1))", if B(P2(m))' and B(P1(m+1)) differ from each other, and causing R(m+1) to set B(P2(m+1)) to B(P2(m+1))' depending on C(m), the operations are performed with respect to m=2, 3, . . . , N−1 in that order; and causing R(N) to send to B information C(N) that "do not invert B(P2(N+1))", if B(P2(N))' and B(P1(N+1)) are the same, and that "invert B(P2(N+1))", if B(P2(N))' and B(P1(N+1)) differ from each other, and causing B to set B(P2(N+1)) to B(P2(N+1))' depending on C(N).

6. The method according to claim 4, wherein, after the individual photons reach A, R(i) and B and until the base used in the detection of the photons is determined by exchanging information between A and R(1), between R(1) and R(2), between R(m) and R(m+1) (m=2, 3, . . . , N−1) and between R(N) and B, and then the detection is performed, the photons are retained in delay lines provided in A, R(1), R(m) and B.

7. A secret key distribution system distributing two random number tables correlated to each other serving as a secret key between sites A and B between which an N number of relay stations R(i) (i=1, 2, . . . , N) are located, the secret key distribution system comprising:

photon generating sections which are provided between A and R(1), between R(m) and R(m+1) (m=1, 2, . . . , N−1) and between R(N) and B, and which generate photon pairs PP(1), PP(k) (k=2, 3, . . . , N), and PP(N+1), respectively;

optical paths to send a photon P1(1) of the photon pair PP(1) to A and a photon P2(1) of the photon pair PP(1) to R(1), a photon P1(k) of the photon pair PP(k) to R(k−1) and a photon P2(k) of the photon pair PP(k) to R(k) (k=2, 3, . . . , N), and a photon P1(N+1) of the photon pair PP(N+1) to R(N) and a photon P2(N+1) of the photon pair PP(N+1) to B, from the individual photon generating sections, respectively;

photon detecting sections, each including a delay line, a base-adjusting optical element and a photon detector, which are provided in each of A, R(i) and B to detect the photons P1(1), P2(1), P1(k), P2(k), P1(N+1), and P2(N+1) sent from the photon generating sections, respectively;

switching signal generators which generate a signal for switching the base for the base-adjusting optical elements to detect photons connected through entanglement using the same base between A and R(1), between R(m) and R(m+1) (m=1, 2, . . . , N−1) and between R(N) and B; and data acquisition-calculation-storage units which are provided in each of A, R(i) and B, and which acquire detected values of the individual photons detected using a certain base in the photon detecting sections and store bits corresponding to the detected values depending on predetermined correspondence, the data acquisition-calculation-storage unit in each relay station being configured to perform calculation and send to a subsequent relay station or B information as to whether to invert one bit depending on two bits acquired in the relay station, and the data acquisition-calculation-storage unit to which the information is sent being configured to operate one bit.

8. The system according to claim 7, wherein the switching signal generators are provided in all of or part of A, R(1), R(m), R(m+1), R(N) and B.

9. The system according to claim 7, wherein the switching signal generators each have a laser light source, a beam splitter, and two photon detectors which are provided at two outlets of the beam splitter and are connected to the drivers of the corresponding base-adjusting optical elements.

10. A secret key distribution system distributing a random number table serving as a secret key between sites A and B between which an N number of relay stations R(i) (i=1, 2, . . . , N) are located, the secret key distribution system comprising:

photon generating sections which are provided between A and R(1), between R(m) and R(m+1) (m=1, 2, . . . , N−1) and between R(N) and B, and which generate photon pairs PP(1), PP(k) (k=2, 3, . . . , N), and PP(N+1), respectively;

optical paths to send a photon P1(1) of the photon pair PP(1) to A and a photon P2(1) of the photon pair PP(1) to R(1), a photon P1 (k) of the photon pair PP(k) to R(k+1) and a photon P2(k) of the photon pair PP(k) to R(k) (k=2, 3, . . . , N), and a photon P1(N+1) of the photon pair PP(N+1) to R(N) and a photon P2(N+1) of the photon pair PP(N+1) to B, from the individual photon generating sections, respectively;

photon detecting sections, each including a delay line, a base-adjusting optical element and a photon detector, which are provided in each of A, R(i) and B to detect the photons P1(1), P2(1), P1(k), P2(k), P1(N+1), and P2(N+1) sent from the photon generating sections, respectively;

switching signal generators which generate a signal for switching the base for the base-adjusting optical elements to detect photons connected through entanglement using the same base between A and R(1), between R(m) and R(m+1) (m=1, 2, . . . , N−1) and between R(N) and B; and data acquisition-calculation-storage units which are provided in each of A, R(i) and B, and which acquire detected values of the individual photons detected using a certain base in the photon detecting sections and store bits corresponding to the detected values depending on predetermined correspondence, the data acquisition-calculation-storage unit in A being configured to perform calculation and send to a subsequent relay station information as to whether to invert one bit depending on a bit stored in A and a bit acquired in A, the data acquisition-calculation-storage unit in each relay station being configured to perform calculation and send to a subsequent relay station or B information as to whether to invert one bit depending on two bits acquired in the relay station, and the data acquisition-calculation-storage unit to which the information is sent from A or a relay station being configured to operate one bit.

11. The system according to claim 10, wherein the switching signal generators are provided in all of or part of A, R(1), R(m), R(m+1), R(N) and B.

12. The system according to claim 10, wherein the switching signal generators each have a laser light source, a beam splitter, and two photon detectors which are provided at two outlets of the beam splitter and are connected to the drivers of the corresponding base-adjusting optical elements.

* * * * *